April 4, 1961     I. E. CAMPBELL     2,978,358
METHOD OF OBTAINING UNIFORM COATINGS ON GRAPHITE
Filed March 28, 1958     2 Sheets-Sheet 1
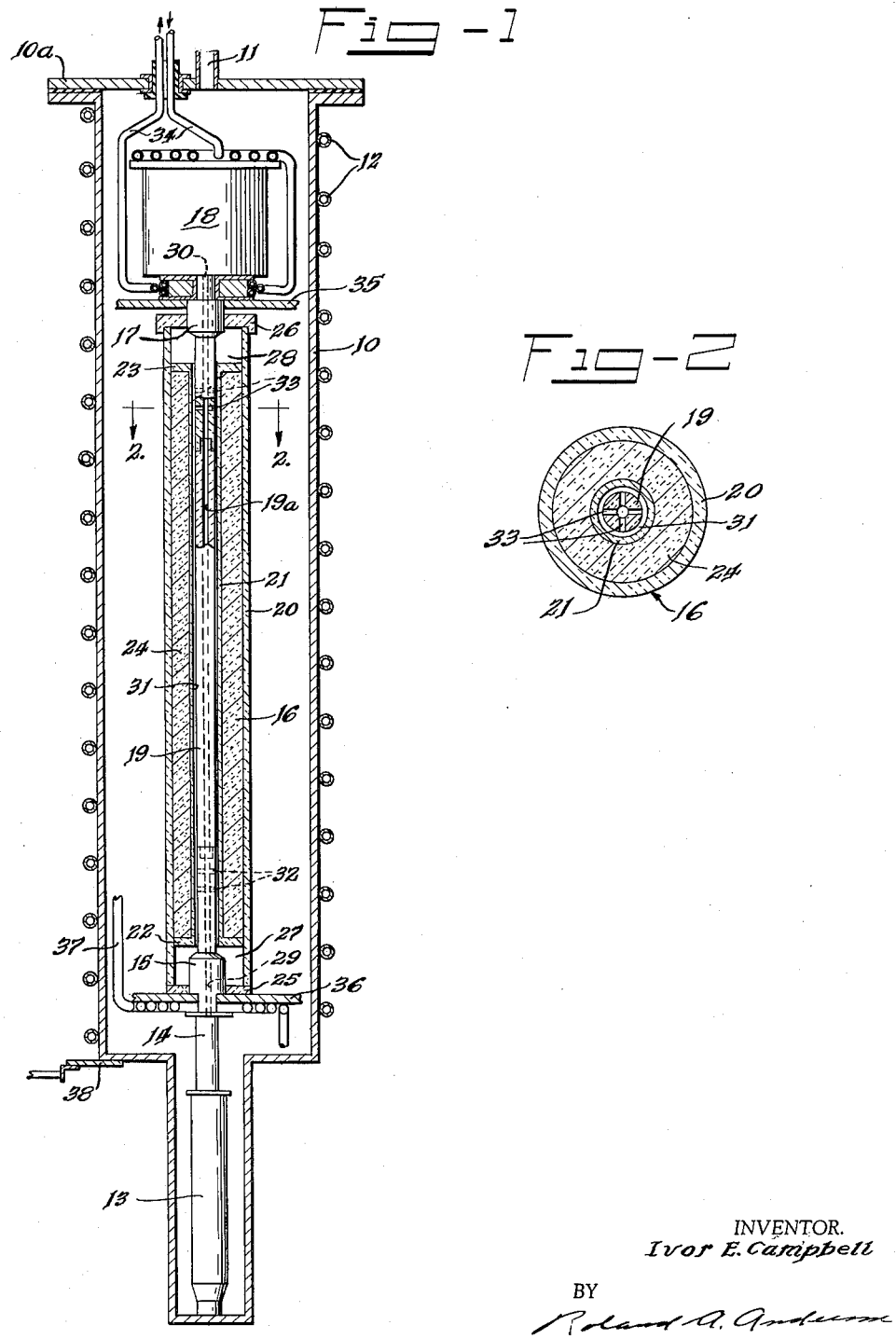
INVENTOR.
Ivor E. Campbell
BY
Roland A. Anderson
Attorney April 4, 1961     I. E. CAMPBELL     2,978,358
METHOD OF OBTAINING UNIFORM COATINGS ON GRAPHITE
Filed March 28, 1958

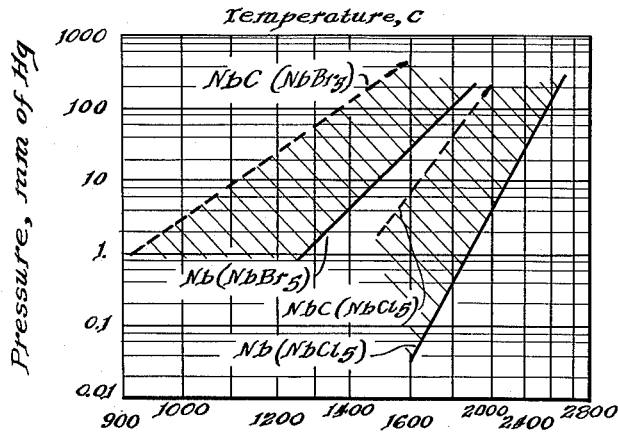

Fig-3

Limiting pressures for formation of NbC on Carbon and of Nb by thermal decomposition of $NbCl_5$ and $NbBr_5$

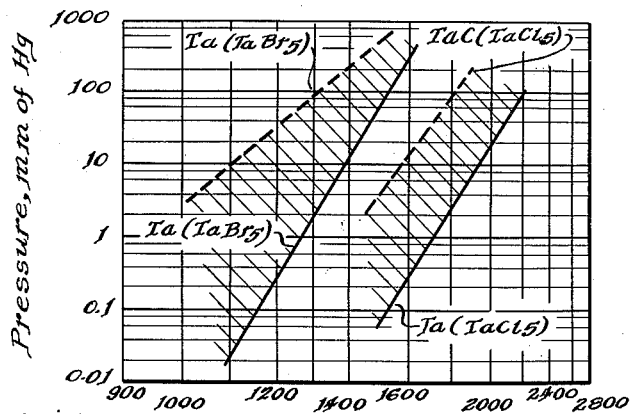

Fig-4

Limiting pressures for formation of TaC on Carbon and of Ta by thermal decomposition of $TaCl_5$ and $TaBr_5$

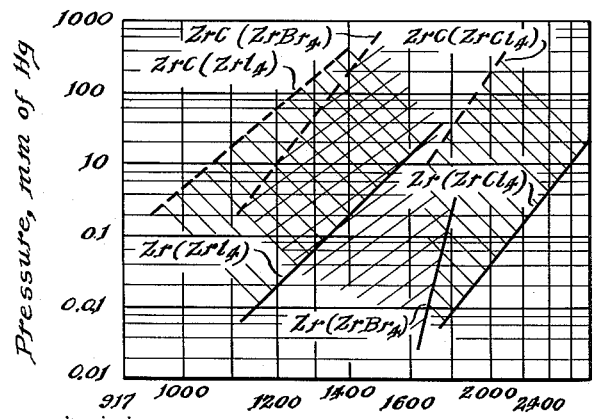

Fig-5

Limiting pressures for formation of ZrC on Carbon and Zr by thermal decomposition of $ZrCl_4$, $ZrBr_4$ and $ZrI_4$ INVENTOR.
Ivor E. Campbell BY
Roland A. Anderson
Attorney

United States Patent Office 2,978,358
Patented Apr. 4, 1961

2,978,358

METHOD OF OBTAINING UNIFORM COATINGS ON GRAPHITE

Ivor E. Campbell, Gahanna, Ohio, assignor to the United States of America as represented by the United States Atomic Energy Commission Filed Mar. 28, 1958, Ser. No. 725,477

3 Claims. (Cl. 117—94)

This invention relates to a method of obtaining uniform, adherent coatings on graphite. In more detail the invention relates to a method for coating graphite bodies with uniform adherent carbide coatings.

It is desirable for many purposes, including use in a nuclear reactor, that graphite bodies be provided with a protective coating to protect the graphite from corrosion and from chemical attack. In some cases this protection is adequately provided by a separate casing or cladding. In others it is desirable to form the coating directly on the graphite body.

A known method for the preparation of such coatings directly on the graphite body is known as the vapor deposition method and comprises passing in vapor form a halide of a metal to be deposited over the graphite body at such a temperature that the halide is thermally decomposed and the metal is deposited on the surface.

It is difficult to obtain uniform coatings over extended surfaces by this method. In some cases special arrangements such as split gas flows, baffling, moving jets, moving specimens, or moving temperature gradients are useful to obtain uniform coatings. Some specimens are virtually impossible to coat by any of these standard techniques.

It is accordingly an object of the present invention to develop a new method of coating graphite.

It is a more detailed object of the present invention to develop a method of coating difficultly coatable graphite bodies with a uniform, adherent coating of a metallic carbide.

It is a still more detailed object of the present invention to provide a method of coating small-bore graphite tubes on the interior and the exterior thereof with metallic carbides.

These and other objects of the present invention are attained by my novel process comprising passing a metallic halide in vapor form over a graphite body under such conditions of temperature and pressure that the halide reacts with the graphite to form a coating of the metal carbide on the surface of the graphite.

The theory of the invention can best be described with reference to a specific example. It has long been known that zirconium iodide can be thermally decomposed to zirconium metal and iodine. Owing to the stability of the lower iodides, $ZrI_3$ and $ZrI_2$, reactions of the type $ZrI_4(g)+Zr(s)\rightarrow 2ZrI_2(g)$ may also occur. In fact, as the pressure of $ZrI_4$ is increased, reactions of the second type become more important. As equilibrium calculations show, at any given temperature there exists a limiting tetraiodide pressure below which zirconium will be deposited and above which metal will be consumed. This situation is general with the gaseous halides of the transition metals.

I have found that a limiting pressure exists at a higher level for reactions of the type $$ZrI_4(g)+C(s)\rightarrow ZrC(s)+4I(g)$$

Thus by operating in the region above the limiting pressure for metal deposition and below the limiting pressure for carbide formation, one can avoid the deposition of metal and form only the carbide. Moreover, if the vapor-flow rate is made sufficiently high, the rate of formation of the coating becomes limited, not by kinetics or mass-transfer considerations at the vapor-carbide interface, but by the rate of diffusion of carbon through the carbide coating. Since the rate of diffusion is inversely proportional to the thickness of the coating, the thickness increase becomes self-regulating and independent of vapor-flow considerations over a wide range.

The metal halide to be employed is an easily vaporized halide of a transition element. The halide must be sufficiently stable that the operation can be carried out at a temperature high enough to obtain a reasonable rate of reaction. Typical halides which may be employed are $ZrI_4$, $TaBr_5$, and $NbCl_5$. Halides of vanadium, molybdenum, tungsten, hafnium, titanium and thorium can also be employed.

The invention will now be described with reference to the accompanying drawings wherein:

Fig. 1 represents a schematic vertical sectional view of a structure in which the method can be carried out on tubular specimens (also shown);

Fig. 2 is a cross sectional view taken on lines 2—2 of Fig. 1;

Figs. 3, 4, and 5 represent graphs showing pressure-temperature ranges favorable to carbide formation and unfavorable to metal deposition.

An apparatus which was designed for the specific purpose of coating small-bore graphite tubes according to my invention is shown in Figs. 1 and 2. Obviously other graphite bodies can be coated in similar apparatus.

The disclosed apparatus comprises a vacuum-tight tank 10 provided with a cover 10a, a vacuum connection 11 passing through cover 10a, and cooling coils 12. Located in the vacuum-tight tank 10 is an interior assembly comprising a vaporizer 13, a vapor conduit 14, a bottom adaptor 15, a heat insulating capsule 16, a top adaptor 17, and a condenser 18. Shown in position in the assembly is the specimen to be coated. This comprises a small-bore graphite tube 19 having an axial bore 19a.

Heat insulating capsule 16 is disposed about graphite tube 19 and comprises an outer annular wall 20, an inner annular wall 21, a bottom annular closure member 22 and an upper annular closure member 23 defining a heat insulating chamber 24. Outer annular wall 20 is extended above and below heat insulating chamber 24 and is joined to bottom adaptor 15 by an electrically insulating ring 25 and to top adaptor 17 by an electrically insulating cap 26 thereby forming lower and upper vapor spaces 27 and 28.

Heat insulating capsule 16 is formed of graphite and contains chrushed graphite in heat insulating chamber 24.

Likewise adaptors 15 and 17 are formed of graphite and have axial passages 29 and 30 respectively drilled therethrough of the same diameter as bore 19a of graphite tube 19. The vapor conduit 14 is formed of stainless steel and connects bottom adaptor 15 with vaporizer 13. Vaporizer 13 is formed of graphite.

Inner annular wall 21 of heat insulating capsule 16 is separated from graphite tube 19 by an annular passage 31. Axial passages 29 and 30 in bottom and top adaptors 15 and 17 and annular passage 31 are connected by radial passages 32 and 33 in bottom and top adaptors 15 and 17 respectively.

Vaporizer 13 and graphite tube 19 are resistively heated on separate circuits. Coiled copper tubing 34, through which a stream of water is passed, conducts the current to the top of tube 19 through stainless steel plate 35. Current at a lower voltage is conducted to the bottom of tube 19 and the top of vaporizer 13 through stainless steel plate 36 by means of copper tubing 37. The bottom of vaporizer 13 is grounded through vacuum tank 10 at terminal 38.

The flow of water through copper tubing 34 also serves to cool condenser 18.

To operate the device the vaporizer is filled with the desired halide and connected to the remainder of the unit. The entire unit is then inserted in the vacuum-tight tank which is then evacuated. The rest of the unit is connected to the vaporizer the last minute before it is inserted in the vacuum chamber. The tank is then evacuated and filled with an inert gas such as argon. The specimen is then raised to the proper temperature and the halide is vaporized at the appropriate rate by heating the vaporizer. Vapor flows up through the stainless steel conduit and the adaptor. A portion of it passes through the radial passages to the annular passage while the remainder passes through the axial passage. At the top the two flows join and pass to the condenser. Meanwhile the proper current is applied to the vaporizer circuit and specimen circuit.

The following examples illustrate the advantageous results obtained by the present method. In these examples tubes of graphite 0.75 inch in outside diameter, 0.25 inch inside diameter, and 18 inches long were coated with zirconium carbide, niobium carbide and tantalum carbide. The graphite tubes were heated by a thyratron-controlled transformer unit having a capacity of 2100 amperes at 29 volts while the vaporizer circuit was fed by a transformer system having a capacity of 500 amperes at 15 volts. The copper tubing used to carry the current was ¼ inch in diameter (.032-inch wall) and was cooled by tap water at 42 gallons per hour.

Tables 1, 2, and 3 give typical data for runs using the above-described apparatus to coat with ZrC, NbC, and TaC using the chlorides of these metals.

*Table 1.—Data from run 13331-28-78LM*

| Halide | $NbCl_5$ |
| --- | --- |
| Weight of charge_____g____ | 255 |
| Pressure_____mm. of mercury__ | 50.0 |
| Coating temperature_____° C____ | 2,000 |

| Time | Specimen Current, amp. | Shield Temp., F. | Vaporizer Current, amp. | Vaporizer Temp., F. | Remarks |
| --- | --- | --- | --- | --- | --- |
| 0930 | | | | | Unit assembled and evacuated. |
| 1010 | 65 | | | | Specimen fired and pressure brought to 50.0 mm. mercury with helium. |
| 1015 | 440 | | | | Power raised to specimen. |
| 1025 | 445 | | | | |
| 1035 | 440 | | | | |
| 1045 | 440 | | | 120 | |
| 1050 | 440 | | | 125 | Vaporizer coolant drained. |
| 1055 | 440 | 1,400 | 160 | 160 | Vaporizer fired. |
| 1100 | 445 | | 160 | 385 | |
| 1105 | 450 | | 165 | 460 | |
| 1110 | 450 | 1,410 | 165 | 470 | |
| 1120 | 455 | | | 185 | 490 | Vaporizer power raised. |
| 1130 | 460 | 1,440 | 200 | 520 | Do. |
| 1140 | 465 | | 215 | 570 | Do. |
| 1150 | 470 | 1,440 | 235 | 630 | Do. |
| 1155 | 475 | | 235 | 650 | |
| 1200 | | | | | All power off. |
| 1300 | | | | | Pressure brought with helium to atmospheric and unit opened. |

*Table 2.—Data from run 13331-19-75LF*

| Halide | $TaCl_5$ |
| --- | --- |
| Weight of charge_____g____ | 395 |
| Pressure_____mm. of mercury__ | 100 |
| Coating temperature_____° C____ | 2,000 |

| Time | Specimen Current, amp. | Shield Temp., F. | Vaporizer Current, amp. | Vaporizer Temp., F. | Remarks |
| --- | --- | --- | --- | --- | --- |
| 0900 | | | | | Unit assembled and evacuated. |
| 0945 | 65 | | | | Specimen fired. |
| 0950 | 460 | | | | Pressure brought to 100.00 mm. of mercury with helium, power raised. |
| 1000 | 445 | | | | |
| 1010 | 440 | | | | |
| 1020 | 440 | | | 130 | |
| 1025 | 440 | 1,400 | | 150 | Vaporizer coolant drained. |
| 1030 | 440 | | 160 | 200 | Vaporizer fired. |
| 1040 | 445 | | 100 | 490 | Vaporizer power raised. |
| 1050 | 455 | 1,410 | 185 | 550 | Do. |
| 1100 | 460 | | 200 | 565 | Do. |
| 1110 | 465 | 1,420 | 205 | 600 | Do. |
| 1120 | 465 | | 230 | 660 | Do. |
| 1125 | 465 | 1,440 | 250 | 710 | Do. |
| 1130 | 465 | | 250 | 735 | |
| 1135 | | | | | All power off. |
| 1230 | | | | | Pressure brought to atmospheric with helium and unit opened. |

*Table 3.—Data from run 13331-73-93LF*

| Halide | $ZrCl_4$ |
| --- | --- |
| Weight of charge_____g____ | 170 |
| Pressure_____mm. of mercury__ | 5.0 |
| Coating temperature_____° C____ | 2,000 |

| Time | Specimen Current, amp. | Shield Temp., F. | Vaporizer Current, amp. | Vaporizer Temp., F. | Remarks |
| --- | --- | --- | --- | --- | --- |
| 1030 | | | | | Unit assembled and evacuated. |
| 1115 | | | | | Pressure brought to 5.0 mm. of mercury with helium. |
| 1120 | 65 | | | | Specimen fired. Power raised. |
| 1125 | 430 | | | | |
| 1135 | 425 | | | | |
| 1145 | 420 | | | | |
| 1155 | 420 | 1,410 | | 150 | Vaporizer coolant drained. |
| 1200 | 420 | | 165 | 230 | Vaporizer fired. |
| 1210 | 420 | 1,440 | 195 | 560 | |
| 1220 | 420 | | 205 | 615 | Vaporizer power raised. |
| 1230 | 425 | 1,470 | 210 | 645 | |
| 1240 | 425 | | 220 | 675 | |
| 1250 | 430 | 1,470 | 220 | 700 | Do. |
| 1300 | 430 | | 240 | 715 | Do. |
| 1310 | 430 | 1,460 | 240 | 780 | |
| 1320 | | | | | All power off. |
| 1415 | | | | | Pressure brought to atmospheric with helium and unit opened. |

X-radiographs of the specimens were made. To obtain the metal-equivalent thickness of the coatings, the radiograph of the specimen was compared with that of a metal-foil step gage, by means of a densimeter. Metal-equivalent thicknesses of $7 \pm 1.5$ mils of niobium, $3 \pm 0.7$ mils of tantalum, and $2 \pm 0.5$ mils of zirconium were found to exist by this method in the above-described examples.

A total of 99 useful specimens were coated with the three carbides in various thicknesses ranging from 0.5 to 20 mils.

To provide the widest possible choice of conditions for the coating work, a number of experiments were performed to determine the limiting halide pressures as a function of temperature. Briefly the technique employed consisted of passing the metal halide vapor at controlled pressure over a resistively heated wire for metal deposition or a carbon rod for carbide formation, increasing the temperature of the deposition surface, and by monitoring the electrical resistance (and/or total emission in the case of the carbides), determining the temperature at which the wire or rod showed neither growth nor attack. The results of this work are shown in Figs. 3, 4 and 5. These graphs, showing the pressure-temperature ranges favorable to carbide formation and unfavorable to metal deposition can be used as a basis for choosing coating conditions. The band between the two lines represents conditions under which carbide coatings can be obtained.

It will be understood that this invention is not to be limited to the details given herein but that it may be modified within the scope of the appended claims.

What is claimed is:

1. A method of forming uniform carbide coatings on graphite comprising passing vapors of a volatile metallic halide selected from the group consisting of zirconium tetraiodide, zirconium tetrabromide, zirconium tetrachloride, tantalum pentabromide, tantalum pentachloride, niobium pentabromide and niobium pentachloride over the graphite under conditions of temperature and pressure defined by the area between the curves showing limiting pressures for formation of the carbide being formed and for thermal decomposition of the halide employed shown in Figs. 3 to 5 of the drawings whereby decomposition of the halide is inhibited and the halide and graphite react to form a metallic carbide coating on the graphite.

2. A method according to claim 1 wherein the rate of feed of halide vapors to the graphite is high enough that the rate defining variable for the reaction of graphite with the halide is the rate of diffusion of carbon through the carbide layer.

3. A method according to claim 1 wherein the graphite is in the form of small-bore tubes and the vapors are passed over the interior and exterior of the tubes.

References Cited in the file of this patent

UNITED STATES PATENTS

| | | |
|---|---|---|
| 487,046 | Clegg | Nov. 29, 1892 |
| 553,296 | Aylsworth | Jan. 21, 1896 |
| 2,030,695 | Erber | Feb. 11, 1936 |
| 2,685,543 | Sindeband | Aug. 3, 1954 |
| 2,745,932 | Glasser | May 15, 1956 |
| 2,822,301 | Alexander et al. | Feb. 4, 1958 |